Oct. 18, 1927.
W. B. MILES
1,646,161
CHILD'S VEHICLE
Filed April 10, 1926
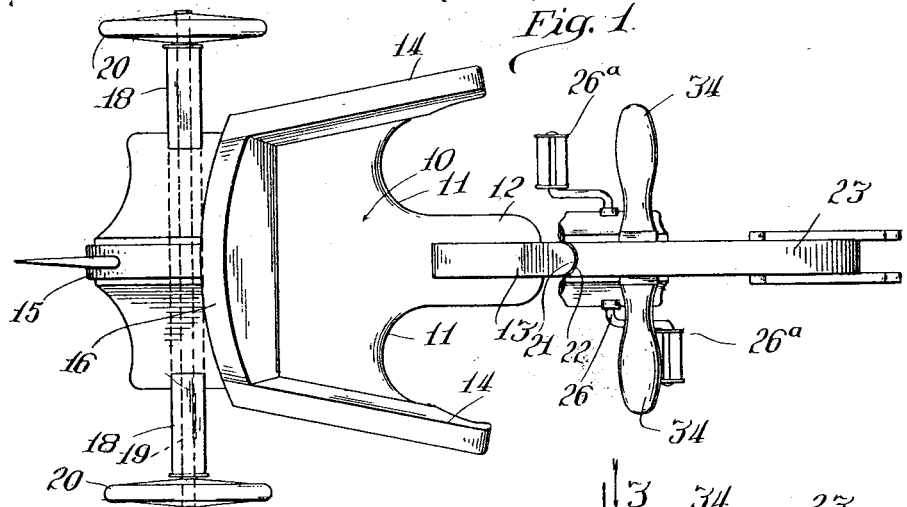
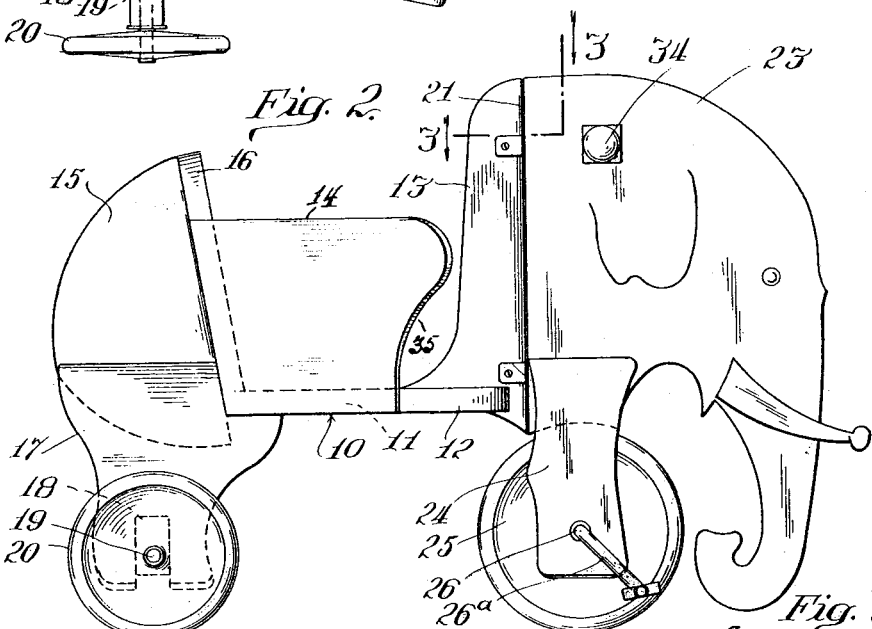
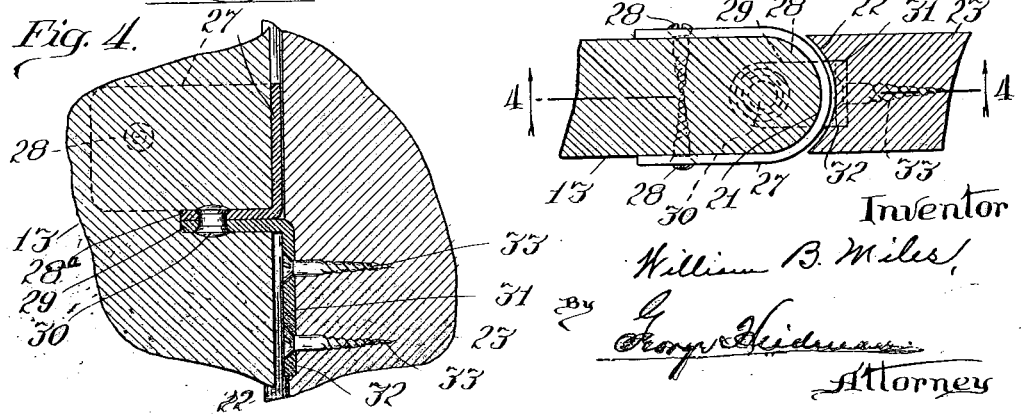

Patented Oct. 18, 1927.

1,646,161

UNITED STATES PATENT OFFICE.

WILLIAM B. MILES, OF DOWNERS GROVE, ILLINOIS, ASSIGNOR OF ONE-HALF TO JOHN ROBERT KING, OF DOWNERS GROVE, ILLINOIS.

CHILD'S VEHICLE.

Application filed April 10, 1926. Serial No. 101,011.

My invention relates to a vehicle adapted for use by children and to be propelled by the rider, preferably through the operation of suitable pedals; the vehicle, however, being of such construction that propulsion may also be induced by the feet of the rider on the surface over which the vehicle moves.

One object of my invention is to provide a vehicle in the semblance of an animal, for example a jungle animal as illustrated in the drawing, adapted to be used by a very young child of say two or three years without possibility of tipping or the child falling off the vehicle.

Another object of my invention is to provide a vehicle of the type mentioned wherein the child's legs will have complete freedom for operation of the vehicle, whether that be by means of pedals or through contact of the child's feet with the surface or ground; the invention contemplating a structure which may be readily guided or steered by the occupant and wherein the occupant's weight is so placed relative to the axles of the vehicle that tipping of the vehicle is impossible while steering may be easily accomplished.

The objects and advantages of my construction will be more readily comprehended from the detailed description of the accompanying drawing, wherein—

Figure 1 is a top plan view.

Figure 2 is a side elevation.

Figure 3 is a detail sectional view taken substantially on the line 3—3 of Figure 2 looking in the direction of the arrows.

Figure 4 is a detail sectional view taken on the line 4—4 of Figure 3 looking in the direction of the arrows.

The vehicle, for purposes of exemplification, is shown in the semblance of an elephant; it being understood, of course, that the representation of any other jungle or domestic animal may be employed. The body of the animal represented constitutes the body portion of the vehicle; the intermediate part being cut away to constitute a seat portion 10 which may consist of an integral horizontally disposed portion or board constituting the lower part of the body or trunk of the animal. The seat is, therefore, arranged a considerable distance beneath the plane of the top so that the center of gravity will be disposed comparatively close to the ground or axles of the vehicle and tendency of tipping thereby avoided. The seat portion 10 is of comparative width and cut away at 11 to provide suitable recesses for reception of the legs of the child, which therefore straddle or are disposed on opposite sides of the forwardly projecting reduced portion 12 of the seat which is suitably connected or formed integral with the vertically disposed portion 13 constituting the shoulders or forward portion of the body of the animal immediately rearward of the fore-legs, as clearly shown in Figure 2.

The seat 10, at opposite sides, is provided with the upstanding and forwardly flaring or sloping portions or side boards 14, 14 extending a considerable distance above the seat proper. With this construction any possibility of the child falling sidewise off the seat 10 will be eliminated. The rear or haunch portion of the animal indicated at 15 extends above the seat 10 to a considerable distance and thus provides a back-rest 16 for the occupant. The portion 15, at opposite sides, is provided with the leg portions 17; the lower ends whereof are shown vertically slotted to receive a suitable wooden axle 18 which is channeled to receive the metal rod or axle 19; both axles extending continuously from side to side. The opposite ends of the axle 19 extend beyond the ends of axle or bearing member 18 and are provided with suitable wheels as at 20, 20; the wheels 20, 20 being shown preferably of relatively small diameter in order to maintain the seat 10 within short distance of the ground or surface.

With the sides 14, 14 flaring toward the front as shown in Figure 1 and the seat 10 cut away or recessed as shown at 11, 11, it is evident that the child is given freedom not only for proper propulsion of the vehicle, but also for easy access thereto.

The upwardly disposed shoulder portion 13 is made arcuate at the forward longitudinal edge as shown at 21 in Figure 3 to conform with the concavity 22 of the head or forward portion 23. The head portion 23 is provided with the leg portions 24 spaced apart sufficiently to receive the front steering wheel 25 therebetween and to provide bearing for the journal 26 to which the wheel 25 is fixedly secured or keyed; the ends of the journal 26 being preferably provided with suitable pedals 26ª, 26ª having the usual crank-arms for connection with the journal 26. The wheel 25 is preferably of slightly larger diameter than the rear wheels 20 in order that comparatively easy operation of the vehicle by the child is possible.

The head portion 23 with the propelling and steering wheel 25 is secured to the body portion of the vehicle, namely to the shoulder portion 13, by means of the hinge elements now to be described. One element of each hinge comprises a U-shape strap 27 arranged about the forward arcuate or convex portion of the shoulder 13 so as to be in lapping relation with opposite sides of the shoulder portion 13 to which the strap member 27 is properly secured, as for example by means of the screws 28. The bottom of the strap or U-shape member 27 at the intermediate or curved portion thereof is provided with a rearwardly disposed plate or leaf 28ᵃ arranged in a suitable groove cut into the forward edge of the shoulder portion 13, as more clearly shown in Figure 4. The groove is also formed so as to receive a rearwardly presented leaf or plate 29, of the correlated hinge member. The leaf 29 is arranged parallel with leaf or plate 28ᵃ; and the two portions 28ᵃ and 29 are secured together by the swivel member 30 see Figure 4. The portion 29 is formed integral with the upper end of the lower hinge member 31 arranged within a suitable socket 32 formed in the arcuate or concaved rear longitudinal face of the head 23, to which the hinge member 31 is suitably secured, as for example by means of the screws 33. The hinge members 27 and 31 are made of comparatively strong metal and any suitable number of hinge elements are employed; for example, a hinge being located adjacent to the top and bottom of the head portion 23 as shown in Figure 2.

With the style of hinge shown, the main or seat portion and the forward or steering portion of the vehicle will be securely held in swiveled relation with each other, while at the same time permitting free oscillatory movement of the forward or head portion of the vehicle. The forward or head portion 23 is provided adjacent to the top with a pair of laterally disposed hand-grasps or steering handles 34, 34. The method of swiveling the head portion to the body portion provides a comparatively cheap structure which at the same time has ample strength, as the swiveled portion of the hinge which receives the downward pressure and strains is located within the body portion of the vehicle, namely within the recess as previously described, with the result that the pressure is not exerted at an angle to the swivel point 30 and therefore will not be subjected to what may be termed a shearing strain. At the same time the swiveling of the forward or head portion is such that there is no possibility of the clothing or fingers of the occupant coming into engagement with the swivel point of the hinge.

With a child's vehicle constructed as herein disclosed and described, regardless of the animal simulated, the center of gravity is kept close to the axles of the vehicle and therefore close to the surface or ground; while the seat portion is so arranged that the child's weight is disposed slightly forward of the rear axle or journal 19 and all possibility of rearward tipping is eliminated; at the same time the weight of the occupant is so distributed that easy propulsion and steering of the head portion of the vehicle may be readily accomplished, as the swiveling of the head portion of the vehicle is disposed in a plane slightly rearward of the vertical plane of the forward axle or journal.

The forward ends of the side portions or boards 14, 14 are preferably under-cut as shown at 35, to permit the child's legs to hang down when desired and thus enable the child's feet to contact with the ground, both for comfort and easy dismounting.

For purposes of exemplification, I have shown my invention in the simulation of an elephant, but it will be understood that the vehicle may be made to represent any other animal and that modifications in certain respects may be made without, however, departing from the spirit of my invention.

What I claim is:

1. A vehicle of the character described, comprising a body in semblance of an animal composed of the main or trunk portion and the fore or head portion, hingedly secured together, the main portion being cut out at top to a point adjacent to the bottom to provide a seat below the longitudinal axis of the body, side portions on opposite sides of the seat spreading toward the front, the hinge connection between the main portion and the head portion consisting of two complementary members, one of said members being of loop form arranged to straddle the forward end of the body portion to which it is secured, the intermediate portion of said member being provided with a flat horizontally disposed plate extending rearwardly into a groove in the body portion, the other member being secured to the head portion and having a plate portion arranged in the groove of the body portion parallel with the plate of the other member, the two plate portions being pivotally secured together within the groove, supporting wheels secured to the bottom of the rear end of the body portion and arranged beyond the sides of the body, and a wheel journaled at the bottom of the head portion.

2. A vehicle of the character described, comprising a sectional body, one section being cut away at top to provide a child holding pit, the bottom of the pit being open at the forward end on opposite sides of the longitudinal center line of the section, upstanding side boards, a supporting wheel journal secured to the bottom of said section in a vertical plane rearward of the pit, the other body section being hinged at its rear longitudinal edge to the forward longitudinal edge of the first mentioned section, and hinge members secured to each section, each hinge member having a horizontally disposed plate portion extending into a groove at the forward edge of the first mentioned section, the two plate portions being swiveled together.

3. A vehicle of the character described, comprising a sectional body, the one section being cut out to provide a seat below the top cut away at the forward end to provide leg receiving sockets, the section having a groove in the forward edge thereof, upstanding side boards disconnected from the body section at the forward edges, a wheel carrying journal secured to said body section in a vertical plane rearward of the seat, the other section being provided with a steering and propelling wheel, the two sections being hinged together, the hinge consisting of complementary members, one being a strap straddling the forward end of the main section and having an intermediate plate portion extending rearwardly into the groove of the first mentioned section, the other member being secured to the second mentioned body section and having a plate portion extending into the groove of the first mentioned section and parallel with said plate portion of the other hinge member, the two plate portions being swiveled together with the swivel disposed vertically within said groove.

4. In a vehicle of the character described, consisting of a main body section and a head section, a hinge connection between said sections comprising a U-shape strap adapted to fit about the forward edge of the body section and having an intermediate plate portion extending rearwardly into a socket in the body section and an angular strap one leg whereof is secured to the rear edge of the head section while the other leg extends into the socket of the body section and parallel with said intermediate plate portion, said leg and plate portion being secured together by a vertically disposed pivotal point.

5. A vehicle of the character described, in simulation of an animal and composed of a sectional body, the main body section increasing in width toward the rear, said section being cut away to leave a flat horizontally disposed portion at the bottom to constitute a seat, said seat being cut away at the forward end on opposite sides of the longitudinal center line to provide leg receiving passages, wheels journaled at the bottom of the rear end of said section in a plane rearward of said seat, the other section being provided with a wheel substantially at the longitudinal center line and forward of the seat, means for controlling said section, and means for hingedly connecting the two sections together consisting of a pair of horizontally disposed plates secured, respectively, to the two sections, said plates being pivotally secured one on top of the other.

6. In a vehicle of the character described, consisting of a body section and a head section, the forward edge of the body section being provided with a horizontal groove, means for hingedly connecting the two sections together comprising a plate secured to the body section with the plate extending into said groove, and a plate secured to the head section and extending into said groove parallel with the first mentioned plate, the two plates being pivotally connected together within said groove.

7. In a vehicle of the character described, provided with a body section and a head section, means for pivotally securing the two sections together comprising a U-shaped strap adapted to straddle the vertical edge of one section, the middle portion of said strap being provided with a horizontally extending plate portion, and an angle plate, one leg or side whereof is adapted to be secured to the other section with one leg or side extending horizontally and in lapping relation with the plate portion of the U-shaped strap to which it is pivotally connected to swing about a vertically disposed axis.

8. In a vehicle of the character described, provided with a body section, having a convexed forward vertical edge provided with a horizontal slot and a head section having a concaved rear vertical edge to receive the forward edge of the body section, means for pivotally connecting the sections together comprising a U-shaped strap straddling the forward edge of the body section, the intermediate portion of the strap being in the form of a plate extending rearwardly into said slot, and an angle plate, one leg whereof is secured to the rear edge of the head section while the other leg extends into the body slot in lapping relation with the plate of the U-shaped strap to which it is pivotally connected to swing laterally about a vertically disposed axis.

WILLIAM B. MILES.